US011067727B2

(12) United States Patent
Roßbach et al.

(10) Patent No.: US 11,067,727 B2
(45) Date of Patent: Jul. 20, 2021

(54) METHOD OF MANUFACTURING A MULTILAYER OPTICAL ELEMENT

(71) Applicant: OSRAM OLED GmbH, Regensburg (DE)

(72) Inventors: Georg Roßbach, Regensburg (DE); Hubert Halbritter, Dietfurt (DE)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 16/971,529

(22) PCT Filed: Feb. 28, 2019

(86) PCT No.: PCT/EP2019/055044
§ 371 (c)(1),
(2) Date: Aug. 20, 2020

(87) PCT Pub. No.: WO2019/170523
PCT Pub. Date: Sep. 12, 2019

(65) Prior Publication Data
US 2021/0088704 A1 Mar. 25, 2021

(30) Foreign Application Priority Data
Mar. 5, 2018 (DE) .......................... 102018104932.3

(51) Int. Cl.
*G02B 6/136* (2006.01)
*G02B 5/18* (2006.01)

(52) U.S. Cl.
CPC ................................. *G02B 5/1857* (2013.01)

(58) Field of Classification Search
None
See application file for complete search history.

(56) References Cited

U.S. PATENT DOCUMENTS 6,545,809 B1 * 4/2003 Phillips ................ C09C 1/0015
359/577
8,715,516 B2 * 5/2014 Sakamoto ............ G02B 5/1809
216/24

(Continued)

FOREIGN PATENT DOCUMENTS

| DE | 102016115918 A1 | 3/2018 |
| DE | 102016116749 A1 | 3/2018 |
| EP | 1011028 A2 | 6/2000 |

*Primary Examiner* — Shamim Ahmed
(74) *Attorney, Agent, or Firm* — Slater Matsil, LLP (57) ABSTRACT

A method for manufacturing a multilayer optical element is disclosed. In an embodiment the method includes providing a substrate, applying a first optical layer by applying a first layer having a dielectric first material having a first refractive index, structuring the first layer by sectionally removing the first material and filling first interspaces with a dielectric second material having a second refractive index different from the first refractive index so that the second material has at least the same height as the first material, and applying at least a second optical layer by applying a second layer having the first material, structuring the second layer by sectionally removing the first material so that the first optical layer is exposed in second interspaces between second areas with the first material and filling the second interspaces with the second material so that the second material has at least the same height as the first material.

19 Claims, 4 Drawing Sheets

(56) References Cited

U.S. PATENT DOCUMENTS

| | | |
|---|---|---|
| 10,707,118 B2 * | 7/2020 | Godet .................. H01L 25/043 |
| 2009/0244702 A1 | 10/2009 | Okada et al. |
| 2011/0134648 A1 | 6/2011 | Lin et al. |
| 2017/0106690 A1 | 4/2017 | Lee et al. |
| 2019/0204608 A1 | 7/2019 | Brick et al. |

* cited by examiner

METHOD OF MANUFACTURING A MULTILAYER OPTICAL ELEMENT

This patent application is a national phase filing under section 371 of PCT/EP2019/055044, filed Feb. 28, 2019, which claims the priority of German patent application 102018104932.3, filed Mar. 5, 2018, each of which is incorporated herein by reference in its entirety.

TECHNICAL FIELD

The present application concerns a method of manufacturing a multilayer optical element.

BACKGROUND

For example, for shaping or splitting a light beam such as a laser beam, optical elements in the form of diffractive optical elements (DOE: "diffractive optical element") are known, which create interference effects by exploiting the principle of diffraction at an optical grating. There are applications where DOE structures based on dielectric layers are advantageous. Such DOEs are usually epoxy-based and can be manufactured, for example, by nano-imprint lithography with several steps or by molding a master in epoxy. However, such DOEs may pose problems with regard to reflow solderability, for example. If the structures become soft and deform accordingly, eye safety may no longer be guaranteed in connection with lasers, for example. Although inorganic materials offer the advantage of being reflow-solderable and thermally stable, it is very difficult to etch high-precision, multi-level DOE structures with a high aspect ratio.

SUMMARY OF THE INVENTION

Embodiments provide a method for manufacturing a multilayer optical element.

According to at least one embodiment, several optical layers are deposited on a substrate to manufacture a multilayer optical element. The multilayer optical element can be configured in particular as a diffractive optical element. Each of the optical layers can form a so-called binary grating, i.e., a spatial arrangement of areas with different refractive indices. Accordingly, the finished multilayer optical element can have a plurality of such optical layers arranged on top of each other, in other words a plurality of binary gratings arranged on top of each other, so that the multilayer optical element can be designed as a multilayer DOE. The following description refers both to the multilayer optical element and to the method for manufacturing the multilayer optical element.

According to another embodiment, a substrate is provided on which a first optical layer is applied. At least a second optical layer is applied to the first optical layer. Particularly preferably the multilayer optical element thus has at least two optical layers. Furthermore, at least a third optical layer can be applied to the second optical layer so that the multilayer optical element can have at least three optical layers. In addition, more than three optical layers are also possible. The optical layers can preferably be applied directly on top of each other, as well as directly on the substrate.

According to another embodiment, a first layer comprising a dielectric first material with a first refractive index is deposited on the substrate to deposit the first optical layer. In particular, the first layer can be applied directly on the substrate so that the first optical layer can also be arranged directly on the substrate. The first layer with the dielectric first material can in particular be applied to the substrate in a large area and be unstructured. The first layer can then be structured by sectionally removing the first material. This can mean in particular that the first material is completely removed from the substrate in areas so that the first material remains only in desired first areas and first interspaces are created between these first areas in which the substrate is exposed. Furthermore, a thinner rest of the first material can also remain in the first interspaces. However, the etching depth can be decisive for the function and quality of the multilayer optical element and it may be necessary to be able to control this very precisely.

According to another embodiment, the structuring is done by means of an etching process. In particular, a dry chemical etching process such as reactive ion etching can be used for this purpose. In particular, the etching process can be carried out using a mask technology. For example, the structuring can be carried out in such a way that when structuring a layer such as the first layer, for example, the etching is carried out exactly down to the layer below, i.e., to the substrate in the case of the first layer. Alternatively, when patterning a layer such as the first layer, it is also possible to etch into the underlying layer, i.e., in the case of the first layer into the substrate, so that the underlying layer has a smaller thickness in the exposed interspaces than in the areas where the first material remains.

As an alternative to a large-area application of the first material and subsequent structuring of the first layer thus formed by sectionally removing the first material so that the substrate is exposed in first interspaces between first areas with the first material, the application and structuring can also be carried out in a joint method step, i.e., in the form of structured application, for example with the aid of mask technology. In this way, the first material can already be applied to the desired first areas on the substrate during deposition, while the substrate remains exposed in first interspaces between these first areas.

According to another embodiment, the first interspaces are filled with a dielectric second material with a second refractive index different from the first refractive index. This can mean, in particular, that the dielectric second material is applied in the first interspaces, as seen from the substrate, up to a height which is at least equal to the height of the first material in the first areas. In addition, it may also be possible for the second material to be applied at a greater height than the first material. In particular, by filling the first interspaces, the second material can be applied in such a way that it protrudes beyond the first material and/or the first material is covered by the second material.

According to another embodiment, after the second material has been applied, part of a portion of the second material that protrudes beyond the first material is removed. The removal can be done by etching or by thin grinding, for example. In this case, any second material that protrudes beyond the first material can be removed, so that even if the second material is applied up to a greater height than the first material, the second material has the same height as the first material after removal. Furthermore, it may also be possible that a part of the second material which protrudes beyond the first material and which in particular may also cover the first material remains. Such a part of the second material which protrudes beyond the first material, and which remains, can form an intermediate layer which is free of the first material.

In particular, the second material can be used to fill all the first interspaces. The resulting continuous and gapless first optical layer thus has first areas filled with the first material and interspaces filled with the second material, which form a continuous layer. If a part of the second material protrudes beyond the first material and in particular covers it, an intermediate layer can be formed. It can be particularly advantageous if the intermediate layer has a thickness which is less than half, and preferably less than a quarter, of the wavelength of the light for which the multilayer optical element is to be used. Unless otherwise stated, specifications of wavelengths in connection with a layer or material here and below refer to the corresponding wavelength in the layer or material.

According to a further embodiment, at least a second optical layer is applied to the first optical layer with method steps analogous to the application of the first optical layer. This can mean in particular that a second layer comprising the first material is applied to the first optical layer. The second layer can then be structured by sectionally removing the first material so that the first optical layer is exposed with the first material in second interspaces between second areas. As described for the first optical layer, it is also possible that during structuring, etching can be carried out up to or even into the underlying layer, i.e., in this case up to or even into the first optical layer. Furthermore, the application and structuring of the second layer can be carried out in a common method step, i.e., by structured application. The second interspaces can be filled with the second material in such a way that the second material has at least the same height as the first material. In particular, all second interspaces can be filled with the second material. If the second material is applied in such a way that the second material protrudes beyond the first material, the second material can form an intermediate layer according to the previous description or can be formed into an intermediate layer by partial removal.

Analogous to the application of the second optical layer, at least a third optical layer can be applied to the second optical layer in a further method step. Further optical layers can also be applied in analogous method steps.

According to another embodiment, the substrate can be at least partially removed after the application of the optical layers. For example, the removal can be done by thin grinding. Here the substrate can be thinned or completely removed.

According to another embodiment, the method steps described above are used to produce a compound of a plurality of multilayer optical elements. In other words, a wafer is provided as a substrate, for example, on which the first and second materials corresponding to the optical layers of the plurality of multilayer optical elements are applied in areas arranged side by side. By means of singulation, for example by sawing or laser cutting, the compound can be separated into individual multilayer optical elements after completion of the optical layers and, if necessary, after at least partial removal of the substrate.

The method described herein is characterized in particular by the fact that it is a relatively simple, easily scalable process in which any sequence of optical layers forming binary gratings can be applied to each other. Thus, "simple" binary, i.e., two-stage optical layers or diffractive optical layers forming two-stage optical elements are manufactured, in which the last method step can be a planarization and thin grinding of the second material. The individual optical layers are therefore preferably planar, with buried areas with different refractive indices, formed by the areas with the first and second material. The method steps for manufacturing an optical layer are replicated as described above, so that a diffractive optical element can be successively manufactured with several steps in total. In order to avoid interference it is advantageous, as described above, if the intermediate layers, with which optical layers can be adjacent to the optical layer immediately above them, have a thickness of less than a quarter of the wavelength of the light intended for the multilayer optical element.

According to another embodiment, the substrate has an inorganic material or is made of it. For example, glass or silicon or another inorganic material, especially in the form of a wafer, can be used as a substrate. If the substrate remains permanently as part of the multilayer optical element, the substrate preferably has or is made of a transparent material, especially transparent in the light intended for the multilayer optical element in use. Particular preference may be given to one or more of the following materials for the substrate, especially for a transparent substrate: glass, sapphire, SiC, GaN, AlN. The first and the second material may also preferably have or be an inorganic material. In particular, the first and/or the second material can preferably have or be an oxide, nitride or oxynitride, for example with one or more materials selected from Si, Zr, Al, Ga. Furthermore, fluorides such as $MgF_2$ and $CaF_2$ are also possible. The first and/or the second material can be applied for example by sputtering, evaporation, for example electron beam evaporation, or chemical vapor deposition. One or more of the following materials can be selected as the preferred choice for the first and/or the second material: $SiO_2$, SiN, $Al_2O_3$, $MgF_2$, $ZrO_2$, $Ta_2O_5$, $TiO_2$, $Nb_2O_5$, GaN, ZnO, indium tin oxide (ITO). For example, for the infrared range with wavelengths greater than 850 nm or even greater than 950 nm, silicon, (Al)GaAs and (Al)GaP may still be suitable, as these actually typical semiconductor materials can be sufficiently transparent in the specified wavelength range. Thanks to the high refractive index of these materials in a typical range of about 2.5 to about 3.5, the required layer thicknesses can also be very thin. This can result in synergies with existing semiconductor processes. In principle, the assignment of the above-mentioned materials to the first and second material can be freely selected, provided that it is ensured that the refractive index is different. Thus either the first material or the second material can have a higher refractive index than the other material.

For example, the first and the second material can be chosen in such a way that the second refractive index is greater than the first refractive index. The substrate may have substantially the same refractive index as the first or second material. In a particularly preferred embodiment, the substrate comprises glass, especially Si-based glass, the first material comprises silicon nitride and the second material comprises silicon dioxide. This allows the first and second materials to have a refractive index difference of about 0.5 at a wavelength of 850 nm, while the substrate and the second material have substantially the same refractive index.

Dielectric layers, especially dielectric layers with inorganic dielectric materials, are in principle reflow-solderable, so that the multilayer optical element described herein can be reflow-solderable accordingly. The structuring of the first material by an etching method, such as a dry chemical or wet chemical etching process, enables the manufacture of very steep edges, which can enhance the quality of the beam shaping of the multilayer optical element. Furthermore, flatter edges can also be sufficient, since defined production can be achieved with the described method. In addition, the method described here may not require the use of etch stop layers, so that the etching process described herein can in principle be very simple and highly tolerant without the need for corresponding stop layers. In particular, the optical layers can be manufactured in conventional CMOS deposition systems, for which the manufacture of dielectric layers with a thickness of more than 1 µm is problematic, since the multilayer optical element or the optical layers are manufactured in successive stages and, for example, for an application wavelength range for the multilayer optical element of 850 nm to 1000 nm, the optical layers have a thickness of less than 1 µm. For example, at an application wavelength of 850 nm, in the case of silicon nitride for the first material and silica for the second material, it may be advantageous if the thickness of the first material in the optical layers is in the range of about 850 nm or less in each case and, for example, has a value $D=\lambda/(2+\Delta n)$ (with $\lambda$: excitation wavelength and $\Delta n$: refractive index difference), while the thickness of intermediate layers formed by the second material is preferably less than 280 nm (intermediate layer thickness in the half-wavelength area) or even less than 140 nm (intermediate layer thickness in the quarter wavelength area). A preferably three-layer multilayer optical element, i.e., a multilayer optical element with three optical layers, would in this corresponding exemplary embodiment have a corresponding total thickness with respect to the optical layers which corresponds to the sum of the values given for the individual layers.

The multilayer optical element described herein can be reliably manufactured and can form a multi-stage diffractive optical element that can, for example, replace several serial binary diffractive optical elements. In comparison to such serial binary dielectric optical elements, the multilayer optical element described herein can have a higher transparency and thus lower optical losses, thus enabling more efficient beam shaping or beam splitting. In comparison to the manufacturing of binary diffractive elements, the manufacturing method described herein can be carried out in a similarly cost-effective manner.

BRIEF DESCRIPTION OF THE DRAWINGS

Further advantages, embodiments and developments of the invention can be derived from the following description of the exemplary embodiments in connection with the figures.

DETAILED DESCRIPTION OF ILLUSTRATIVE EMBODIMENTS

In the exemplary embodiments and figures, identical, similar or similarly acting elements can each be provided with the same reference signs. The depicted elements and their proportions to each other are not to be regarded as true to scale. Rather, individual elements, such as layers, components, parts and areas, may be depicted in an exaggerated format for better representability and/or understanding.

In conjunction with FIGS. 1A to 1H, a method for manufacturing a multilayer optical element 100 formed as a multi-stage diffractive optical element is shown. As an example only, the multilayer optical element is designed for a wavelength application range in the near infrared wavelength range, i.e., in a wavelength range from 850 nm to 1000 nm. The materials and dimensions described below are particularly suitable for such a wavelength range. Alternatively, other materials such as those described in the general section can be used. Furthermore, the multilayer optical element can also be designed for other application wavelength ranges if the appropriate materials and geometries are selected.

Figure 1A:
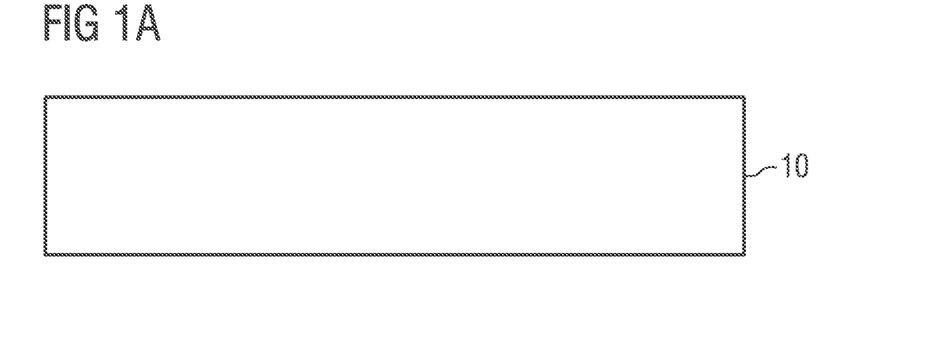
FIGS. 1A to 1H show method steps of a method for manufacturing a multilayer optical element according to an exemplary embodiment.

As shown in FIG. 1A, a substrate 10 is provided in a first method step. The substrate may preferably comprise or be made of glass, in particular Si-based glass which has a refractive index in the range of about 1.5 for light in the near-infrared wavelength range. The substrate 10 is provided and arranged so that at least two optical layers can be applied in accordance with the method steps described below, each of which forms a planar binary DOE.

Figure 1B:
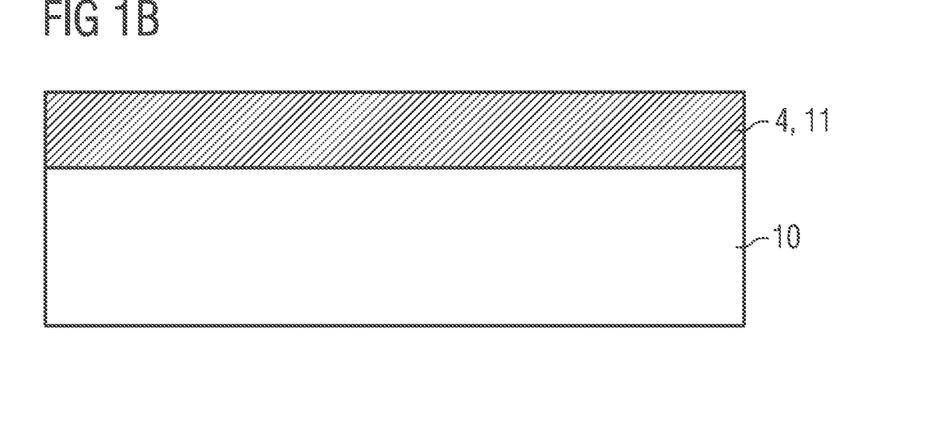
Figure 1C:
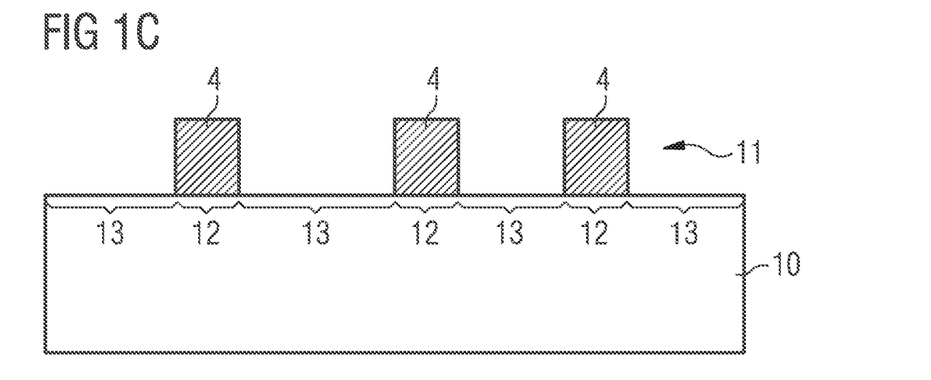
Figure 1D:
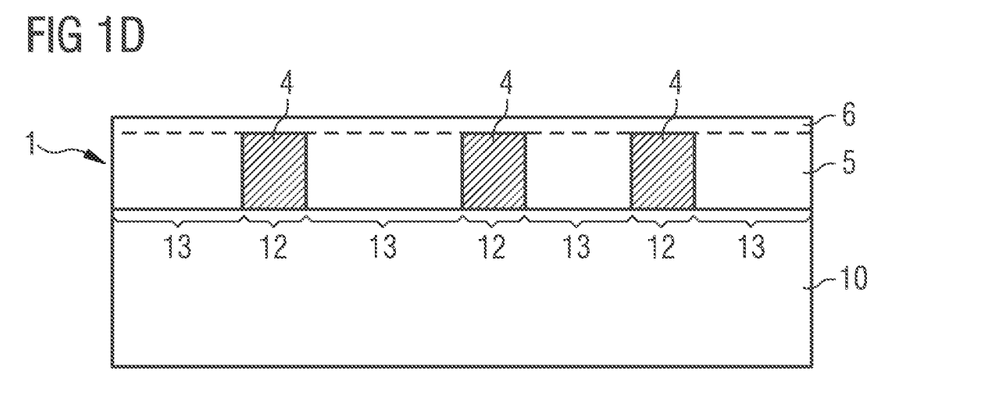

To manufacture a first optical layer 1, as shown in FIG. 1D, a first layer 11 is applied to the substrate 10 in a further method step, as shown in FIG. 1B. The first layer 11 has a dielectric first material 4 and is applied, for example by sputtering, evaporation or chemical vapor deposition, in a large area and is unpatterned. In the exemplary embodiment shown, the first material 4 is formed by silicon nitride, which has a refractive index of about 2 in the near-infrared wavelength range. The first layer 11 in the exemplary embodiment shown can preferably have a typical height of about 575 nm.

Subsequently, the first layer 11 is structured as shown in FIG. 1C by sectionally removing the first material 4. This is done by completely removing the first material 4 from the substrate 10 in preselected regions. In first areas 12 the first material 4 thus remains according to the desired structure, while between the first areas 12 first interspaces 13 are created in which the substrate 10 is exposed. The structures formed by the first material, as indicated in the present figures, are purely exemplary and are not to be understood in a restrictive way with regard to geometry, i.e., shape, size and number. In particular, a large number of first areas can be formed with the first material in a two-dimensional arrangement on the substrate with a preselected regularity or irregularity in order to produce desired diffraction effects.

After structuring the first layer 11, the first interspaces 13 are filled with a dielectric second material 5, as shown in FIG. 1D. The second material 5 can be applied by sputtering, evaporation or chemical vapor deposition. The second material 5 has in particular a second refractive index different from the first refractive index. In the exemplary embodiment shown, the second material can be formed particularly preferably by silicon dioxide, which has a refractive index of about 1.5 in the near-infrared. Thus the first and second materials 4, 5 have a refractive index difference of about 0.5 at a wavelength of about 850 nm, while the substrate 10 and the second material 5 have substantially the same refractive index.

The structuring of the first material 4 is carried out by an etching process. In particular, a dry chemical etching process, such as reactive ion etching, can be used for this purpose by which, if necessary by using suitable etching masks, very steep edges and thus sharp transitions between the first and second material can be manufactured. As indicated in FIG. 1C, the patterning can be performed in such a way that the first material 4 is etched exactly down to the underlying substrate 10. However, it is also possible that when patterning the first layer 11, the substrate 10 is also etched in the interspaces 13, so that the substrate 10 then has a smaller thickness in the exposed interspaces 13 than in the first areas 12 where the first material 4 remains. Since the second material 5 in the exemplary embodiment shown is a material that has essentially the same refractive index as the substrate 10, no negative optical effects result from this, so that etching into the substrate 10 need not be prevented. Thus, for example, an etch stop layer can be dispensed with.

The second material 5 is applied in the first interspaces 13, as seen from the substrate 10 up to a height at least equal to the height of the first material 4 in the first areas 12. As shown in FIG. 1D, it is also possible for the second material 5 to be applied at a greater height than the first material 4. In this case, by filling the first interspaces 13, the second material 5 can be applied in such a way that it protrudes beyond the first material 4, so that, as shown in FIG. 1D, the first material 4 is covered by the second material 5 in particular. Protruding second material, i.e., approximately a part of the part of the second material 5 which protrudes beyond the first material 4, can be removed after the second material 5 has been applied, for example by etching or by thin grinding, whereby the side of the first optical layer 1 thus formed, which faces away from the substrate 10, can be planarized. All second material 5 which protrudes beyond the first material 4 can be removed, so that even if the second material 5 is applied up to a greater height than the first material 4, the second material 5 has the same height as the first material 4 after removal. As shown, it may also be possible for a part of the second material 5 which protrudes beyond the first material 4 and which in particular covers the first material 4 to remain. The part of the second material 5 which protrudes beyond the first material 4 forms an intermediate layer 6, indicated by the dotted line, which is free of the first material 4. In order to avoid interference due to the intermediate layer 6 during subsequent use, it is advantageous if the intermediate layer 6 has a thickness of less than a quarter of the application wavelength. In the exemplary embodiment shown, the intermediate layer 6 can thus preferably have a thickness of less than 250 nm.

Figure 1E:
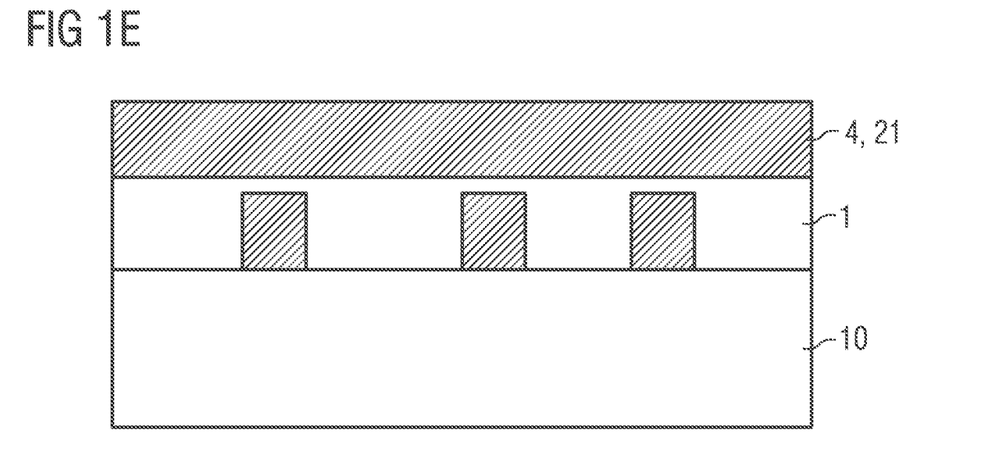
Figure 1F:
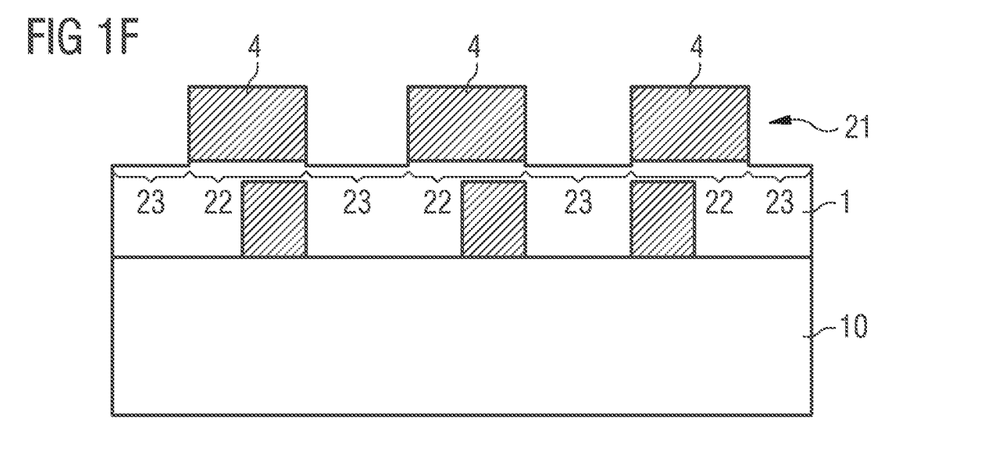
Figure 1G:
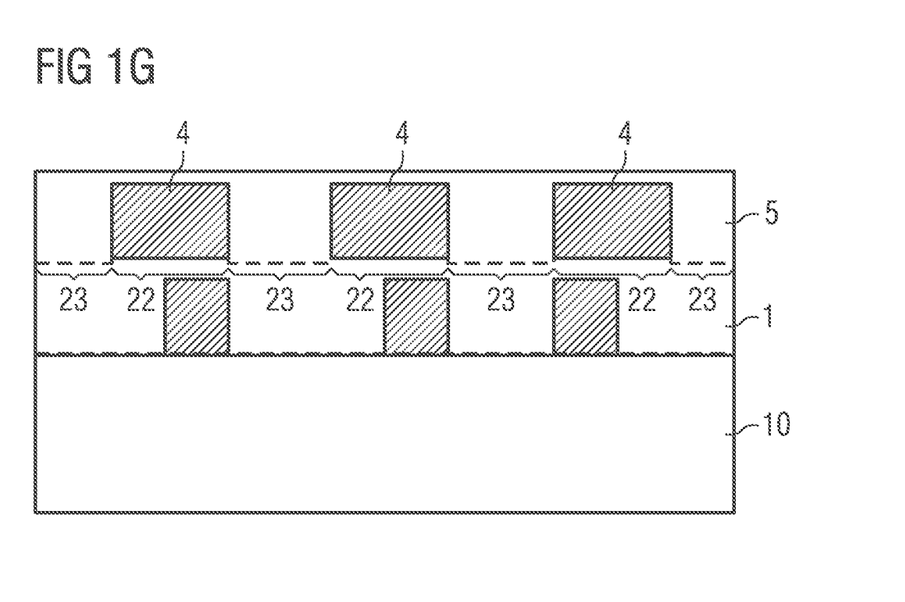

In analogous method steps as shown in FIGS. 1E to 1G at least one second optical layer 2 is applied to the thus manufactured first optical layer 1d, which forms a planar binary DOE by the buried spatial structure of the first and second materials 4, 5, In particular, as shown in FIG. 1E, a second layer 21 comprising the first material 4 is applied to the first optical layer 1 over a large area and in a coherent manner and then, as in the case of the first optical layer 1, is structured by sectionally removing the first material so that the first optical layer 1 is exposed in second interspaces 23 between second areas 22 with the first material 4. In particular, as described for the first optical layer 1 and as indicated in FIG. 1F, it may be in particular possible to etch into the first optical layer 1 during structuring. The second interspaces 23 are again filled with the second material 5 and, if necessary, planarized in such a way that the second material 5 has at least the same height as the first material 4. If the second material 5 is applied in such a way that the second material 5 protrudes beyond the first material 4, the second material 5 can cover the first material 4 according to the previous description and thus form a layer corresponding to the intermediate layer 6. The thickness of the first and second materials 4, 5 of the second optical layer 2 can correspond in particular to the thickness of the first and second materials 4, 5 of the first optical layer 1. The structural arrangement of the second areas 22 of the second optical layer 2 with the first material 4 can be the same or, as shown, can be different from the arrangement of the first areas 12 of the first optical layer 1 with the first material 4, depending on the desired optical effect.

Figure 1H:
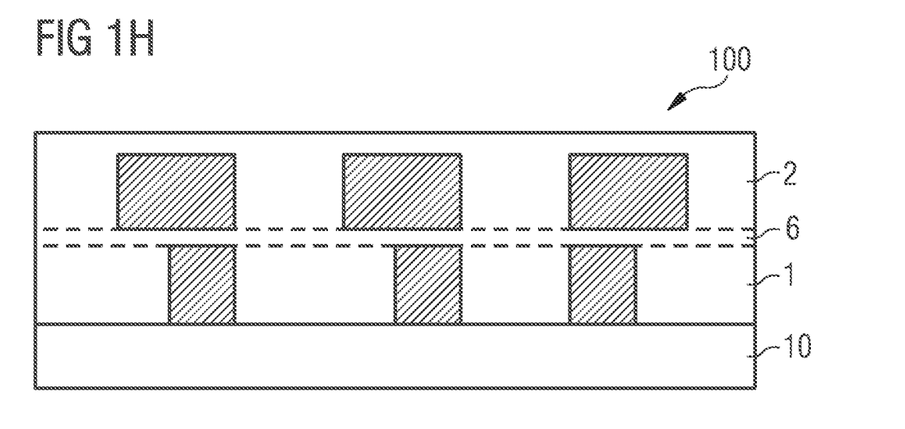

After completion of the optical layers, the substrate 10 can be at least partially removed, i.e., at least thinned, as shown in FIG. 1H. The at least partial removal can be done, for example, by thin grinding.

Figure 2:
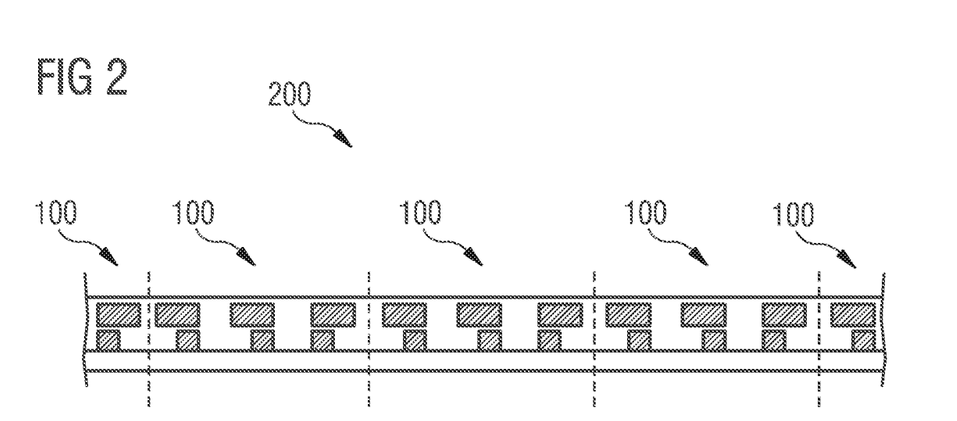
FIG. 2 shows a method step of a method of manufacturing a multilayer optical element according to a further exemplary embodiment.

FIGS. 1A to 1H describe the method of manufacturing the multilayer optical element 100 by manufacturing a single multilayer optical element. In particular, the manufacturing can also be carried out in a compound, so that a plurality of multilayer optical elements can be manufactured in parallel. For this purpose, instead of a single substrate, a wafer is provided as a substrate on which the first and second material for the manufacturing of the optical layers is applied in adjacent areas according to the desired optical properties of the multilayer optical elements. The structures of the multilayer optical elements manufactured in parallel on the substrate can be the same or different. FIG. 2 shows a section of a compound 200 of a plurality of purely exemplary similar multilayer optical elements 100 whose structure corresponds to that of the multilayer optical element of the previous exemplary embodiment. Along the singulation areas indicated by the dotted lines, the compound 200 can be divided into individual multilayer optical elements 100 according to the method steps described in connection with FIGS. 1A to 1H.

Figure 3:
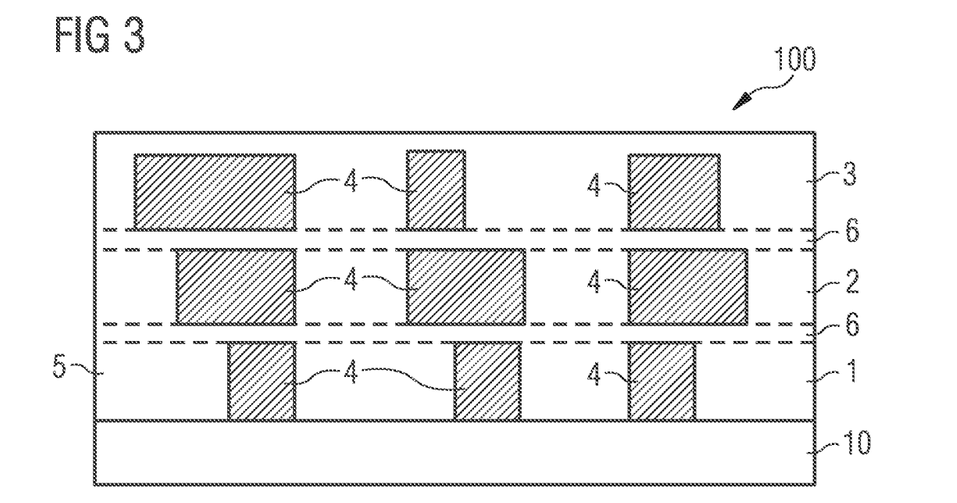
FIG. 3 shows a multilayer optical element according to another exemplary embodiment.

Alternatively to the previous exemplary embodiments, the multilayer optical element 100 can be manufactured with more than two optical layers 1, 2. FIG. 3 shows a preferred exemplary embodiment for a multilayer optical element 100, which additionally has a third optical layer 3, which is manufactured on the second optical layer 2 in the same way as the second optical layer. The multilayer optical element 100 shown in FIG. 3 has intermediate layers 6, which are preferably as thin as possible and especially preferably are not present. In this case, the multilayer optical element 100 can, with respect to the materials described above, have three binary DOEs formed by the three optical layers 1, 2, 3, which are arranged at a height of 0 nm, 575 nm and 1150 nm as seen from the substrate top side. As an alternative to the exemplary embodiment in FIG. 3, more than three optical layers are also possible.

The features and exemplary embodiments described in the figures can be combined with each other according to further exemplary embodiments, even if not all combinations are explicitly described. Furthermore, the exemplary embodiments described in connection with the figures may alternatively or additionally have further characteristics as described in the general part.

The invention is not limited by the description of the exemplary embodiments. Rather, the invention comprises any new feature as well as any combination of features, which in particular includes any combination of features in the claims, even if that feature or combination itself is not explicitly stated in the claims or in the exemplary embodiments.

The invention claimed is:

1. A method for manufacturing a multilayer optical element, the method comprising:
   providing a substrate;
   applying a first optical layer by:
     applying a first layer comprising a dielectric first material having a first refractive index;
     structuring the first layer by sectionally removing the first material; and
     filling first interspaces with a dielectric second material having a second refractive index different from the first refractive index so that the second material has at least the same height as the first material; and applying at least a second optical layer by:
   applying a second layer comprising the first material;
   structuring the second layer by sectionally removing the first material so that the first optical layer is exposed in second interspaces between second areas with the first material; and
   filling the second interspaces with the second material so that the second material has at least the same height as the first material.

2. The method according claim 1, wherein the first and/or second material is applied by sputtering, evaporation or chemical vapor deposition.

3. The method according to claim 1, wherein structuring comprises etching.

4. The method according to claim 3, wherein etching comprises a dry chemical etching process or a wet chemical etching process.

5. The method according to claim 3, wherein etching comprises etching into a respective underlying layer.

6. The method according to claim 1, wherein the substrate has substantially the same refractive index as the first or second material.

7. The method according to claim 1, wherein the second refractive index is greater than the first refractive index or vice versa.

8. The method according to claim 1, wherein each of the substrate, the first material and the second material comprises an inorganic material.

9. The method according to claim 1, wherein the substrate comprises glass.

10. The method according to claim 1, wherein the first material comprises silicon nitride and the second material comprises silicon dioxide.

11. The method according to claim 1, wherein the first material comprises silicon dioxide and the second material comprises silicon nitride.

12. The method according to claim 1, wherein the second material is applied during manufacturing of the first and/or second optical layer at such a height that the second material protrudes beyond the first material and covers the first material.

13. The method according to claim 12, wherein a part of the second material protruding beyond the first material forms an intermediate layer which is free from the first material.

14. The method according to claim 12, wherein a part of a portion of the second material protruding beyond the first material is removed after applying the second material.

15. The method according to claim 14, wherein removing the first material comprises removing the first material by thin grinding.

16. The method according to claim 1, further comprising applying at least a third optical layer by:
   applying a third layer comprising the first material;
   structuring the third layer by sectionally removing the first material so that the second optical layer is exposed in third interspaces between third areas with the first material; and
   filling the third interspaces with the second material so that the second material has at least the same height as the first material.

17. The method according to claim 1, further comprising forming a compound of a plurality of multilayer optical elements by singulation.

18. The method according to claim 1, wherein the substrate is at least partially removed after applying the optical layers.

19. The method according to claim 18, wherein removing comprises removing by thin grinding.

* * * * *